(12) United States Patent
Bitter et al.

(10) Patent No.: US 12,705,995 B1
(45) Date of Patent: Aug. 11, 2026

(54) VIDEO CONVERSION TO EXTENDED REALITY (XR) INSTRUCTIONS WITH HAPTIC FEEDBACK

(71) Applicant: UIPCO, LLC, San Antonio, TX (US)

(72) Inventors: Dustin Bowen Bitter, Lehi, UT (US); Timothy Blair Chalmers, San Antonio, TX (US); Megan Sarah Jennings, San Antonio, TX (US); Ric M. Peña, Boerne, TX (US); Nathan Lee Post, Rockport, TX (US); Rodney Tyrone Thomas, Cibolo, TX (US); Paula Ann Whittington, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 126 days.

(21) Appl. No.: 18/788,542

(22) Filed: Jul. 30, 2024

Related U.S. Application Data

(60) Provisional application No. 63/516,606, filed on Jul. 31, 2023.

(51) Int. Cl.
*G09B 5/06* (2006.01)
*G06F 3/01* (2006.01)
*G06T 19/00* (2011.01)

(52) U.S. Cl.
CPC .............. *G09B 5/065* (2013.01); *G06F 3/011* (2013.01); *G06F 3/016* (2013.01); *G06T 19/00* (2013.01); *G06T 2210/32* (2013.01)

(58) Field of Classification Search
CPC ........... G09B 5/065; G09B 5/06; G06F 3/011; G06F 3/016; G06T 19/00; G06T 2210/32
See application file for complete search history.

(56) References Cited

U.S. PATENT DOCUMENTS

| | | | | |
|---|---|---|---|---|
| 2021/0394020 | A1* | 12/2021 | Killen | A63B 24/0006 |
| 2022/0392175 | A1* | 12/2022 | Freiwirth | H04L 65/1093 |
| 2023/0135138 | A1* | 5/2023 | Komatsu | G09B 9/085 |
| 2023/0406363 | A1* | 12/2023 | Perumalla | B60W 60/0053 |

* cited by examiner

*Primary Examiner* — Timothy A Musselman
(74) *Attorney, Agent, or Firm* — Plumsea Law Group, LLC

(57) ABSTRACT

A system and method for generating extended reality videos and using the extended reality videos to provide instructions for physical tasks is disclosed. Specifically, the embodiments allow a user to request extended reality guidance for a given physical task. The system and method retrieve corresponding guidance videos and convert the guidance videos into an extended reality format. The converted videos are provided to a user, and embodiments track the user's movements as the user performs the given physical task. The correctness of the tracked user movements is confirmed. Embodiments provide feedback to the user based on the confirmed correctness of the user movements. For example, the feedback may include at least one of visual feedback, auditory feedback, and haptic feedback, and the feedback may help the user correct incorrect movements.

13 Claims, 7 Drawing Sheets

VIDEO CONVERSION TO EXTENDED REALITY (XR) INSTRUCTIONS WITH HAPTIC FEEDBACK

CROSS-REFERENCE TO RELATED APPLICATIONS

This application claims the benefit of Provisional Patent Application No. 63/516,606 filed Jul. 31, 2023, and titled "Video Conversion to Extended Reality (XR) Instructions with Haptic Feedback," which is incorporated by reference herein in its entirety.

TECHNICAL FIELD

The present disclosure generally relates to extended reality, and in particular to converting instructional videos into an extended reality format with haptic feedback.

BACKGROUND

It may be desirable to provide instructions to a user as to how to accomplish a physical task. For example, a user might want to replace a filter in a Heating, Ventilation, and Air Conditioning (HVAC) unit, insert a graphics card into a computer motherboard, or perform another physical task. Often, video repositories may include videos illustrating how a user may perform such tasks. However, such videos are generally recorded from a third-person perspective. Because of this perspective, it may be difficult for a user to appreciate the best way to perform a physical task simply by watching such a video. Moreover, in addition to the issue of the perspective, sometimes users do not appreciate when their movements are correct and when their movements are incorrect, and current approaches do not provide an effective way of providing such guidance to users.

There is a need in the art for a system and method that addresses the shortcomings discussed above.

SUMMARY

In one aspect, a method of generating extended reality videos and using the extended reality videos to provide instructions for physical tasks includes receiving a request for extended reality guidance for a given physical task. The method also includes retrieving guidance videos showing how to perform the given physical task. The method further includes converting the guidance videos to an extended reality video. The method also includes providing the extended reality video to a user. The method further includes tracking user movements while the user performs the given physical task. The method also includes confirming correctness of the user movements. The method further includes providing feedback to the user based on the correctness of the user movements.

In another aspect, a method of generating extended reality videos and using the extended reality videos to provide instructions for physical tasks includes receiving a request for extended reality guidance for a given physical task. The method also includes retrieving a guidance video showing how to perform the given physical task. The method further includes converting the guidance video to an extended reality video. The method also includes providing the extended reality video to a user. The method further includes tracking user movements while the user performs the given physical task. The method also includes confirming correctness of the user movements. The method further includes providing haptic feedback to the user based on the correctness of the user movements.

In another aspect, a system for generating extended reality videos and using the extended reality videos to provide instructions for physical tasks includes at least one processor configured to receive a request for extended reality guidance for a given physical task. The at least one processor is also configured to retrieve guidance videos showing how to perform the given physical task. The at least one processor is further configured to convert the guidance videos to an extended reality video. The at least one processor is also configured to provide the extended reality video to a user. The at least one processor is further configured to track user movements while the user performs the given physical task. The at least one processor is also configured to confirm that the user movements are incorrect. The at least one processor is further configured to provide feedback to the user to help the user correct the user movements.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
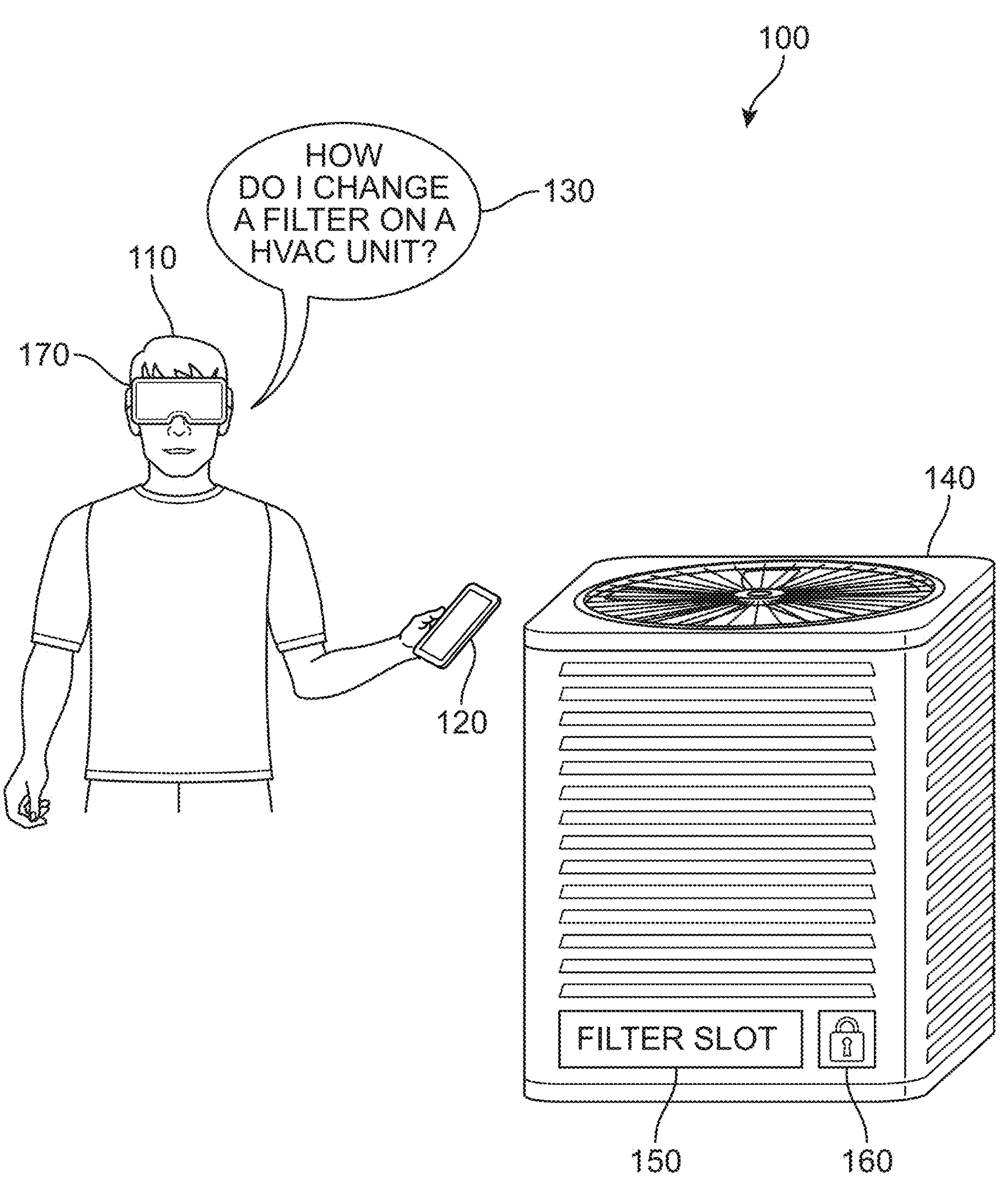
FIG. 1 is a schematic view of a user with an extended reality (XR) headset requesting instructions about how to change an HVAC filter, according to an embodiment.

The embodiments provide systems and methods for converting videos into extended reality videos. Specifically, the embodiments provide systems and methods that allow users to identify physical tasks that the users wish to accomplish. Such physical tasks may include moving the users' hands (or other portions of their bodies) in certain ways. The physical tasks may also involve manipulating a physical entity or a portion of a physical device.

To instruct the user as to how to perform the physical tasks, the embodiments retrieve videos showing how to perform the physical tasks from a video source. Such a video source, as discussed below, may be a web search engine that searches the Internet or may be a website or another storage repository that stores videos illustrating how to perform the physical tasks. As discussed, the videos may show different perspectives for how to perform the physical tasks. For example, the videos may be from a third-person perspective. Alternately, the videos may be from a first-person perspective.

The video or videos showing how to perform the physical tasks are converted to appropriate extended reality (XR) videos. Such XR videos are presented to the user to show the user how to accomplish the physical tasks. For example, the XR videos may provide at least one of visual, auditory, and haptic feedback that help the user perform the physical task. In some embodiments, the XR videos may show phantoms showing the user how to move the user's hands when performing the physical task. Such phantoms are outlines that show positions where the user hands are to be positioned. The phantoms may also be animated to show how the user's hands are to move when performing the physical task.

Additionally, the XR videos may be processed to produce a series of instructions corresponding to the XR videos. Such instructions may make it easier for a user to understand how to perform the physical task. The instructions may be derived from analyzing the content of the XR videos, such as by using machine vision. The instructions may also be derived by analyzing an audio track for the XR videos. For example, a person who is demonstrating how to perform a task may comment how to perform the task. Hence, analyzing the audio track using techniques such as speech recognition and Natural Language Processing (NLP) will indicate what the steps discussed in the audio track corresponding to the physical task are.

Another way to determine the instructions is to perform a separate Internet search or information retrieval task. Such a separate retrieval may obtain a document, such as a webpage, that includes instructions for performing the task. Such instructions can be interpreted using NLP and then mapped to the video by using machine vision. For example, if the user is installing a graphics card into a motherboard, there may be a separate search to find a document that lists a series of steps included in performing such a physical task.

As used herein, the term "video" refers to a sequence of images (also referred to as frames). This sequence of images may be stored in digital memory on a computing device and/or on a separate memory device, and thereby copied, modified, or deleted, by a computing device comprising at least a processor. The term "audio" refers to a sequence of sounds. This sequence of sounds may be stored in digital memory of some kind and thereby copied, modified, or deleted, by a computing device comprising at least a processor.

FIG. 1 is a schematic view 100 of a user with an extended reality (XR) headset requesting instructions about how to change an HVAC filter, according to an embodiment. Specifically, FIG. 1 shows a user 110 who has an extended reality (XR) headset 170. The user is also holding a mobile device 120. While mobile device 120 is shown in FIG. 1 as being a smartphone, it will be recognized that a smartphone is only an example of a mobile device 120 and other appropriate devices may serve as a mobile device 120, such as a phablet, a tablet, a personal media player, a laptop computer, a 2-in-1 computer, and so on. Additionally, the user 110 is not limited to a mobile device 120, and a computing device that is not intended to be mobile may serve instead of mobile device 120, such as a desktop computer or an all-in-one computer.

In FIG. 1, the user 110 poses a question 130 that specifies the physical task for which help is needed. For example, in FIG. 1, the specific question 130 presented by the user 110 is "How Do I Change a Filter On A HVAC Unit?" Here, a HVAC unit 140 refers to a Heating, Ventilating, and Air Conditioning unit. In FIG. 1, user 110 is shown as being proximate to HVAC unit 140. The HVAC unit 140 includes a filter slot 150. The filter slot 150 contains the filter for the HVAC unit. The HVAC unit 140 also includes a filter lock 160. The filter lock 160 may be a button, a dial, or some other type of control that locks the filter in place in the filter slot 150.

Figure 2:
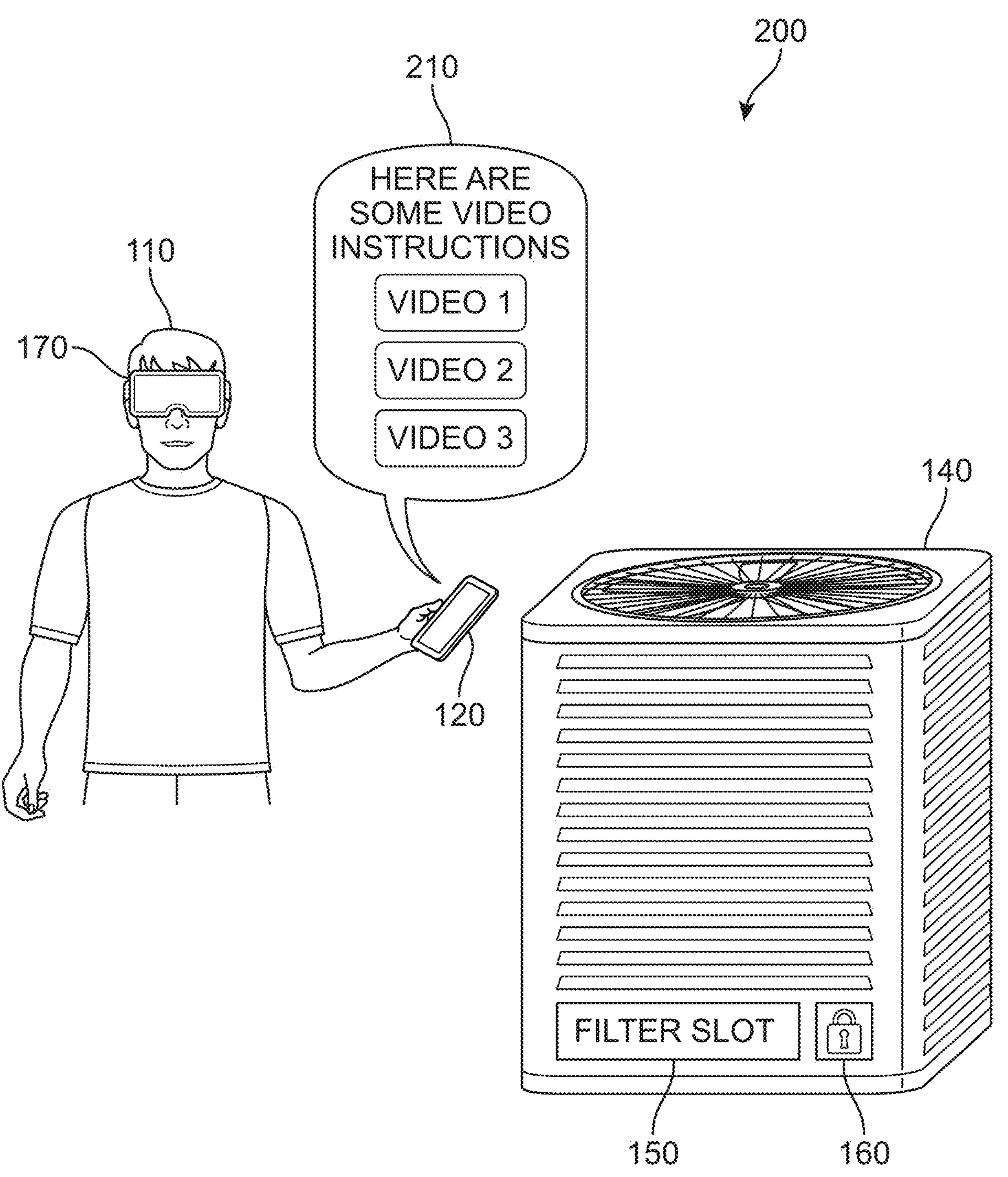
FIG. 2 is a schematic view of a user with an extended reality (XR) headset receiving proposed video instructions as to how to change the HVAC filter, according to an embodiment.

FIG. 2 is a schematic view 200 of a user with an extended reality (XR) headset receiving proposed video instructions as to how to change the HVAC filter, according to an embodiment. FIG. 2 again shows user 110, the user 110 having an XR headset 170. The user's mobile device 120 provides a set of search results 210 that are responsive to the question 130 previously posed by user 110. For example, the search results 210 may have the label "Here Are Some Video Instructions" along with buttons labelled "Video 1," "Video 2," and "Video 3." These video instructions each indicate how to replace the filter in HVAC unit 140, by properly manipulating a filter into or out of a filter slot 150. The filter lock 160 may also be adjusted to unlock the filter when it is replaced in the filter slot 150. For example, the videos could illustrate how a user 110 manipulates a new filter into the filter slot 150 during a demonstrated installation process.

Some embodiments may include provisions for establishing a user's desire to perform a physical task. In some embodiments, the desire may be established based on receiving a vocal command. In some cases, the vocal command may be a natural language command. In some embodiments, the vocal command may be used as a prompt to a search engine. In some cases, the search engine is a web search engine that searches the Internet. In some embodiments, the search engine searches an online repository of videos. In some cases, the online repository may be the YouTube® online video repository or a similar online video repository.

In some embodiments, the vocal command is used to retrieve a single video that is related to the vocal command. In some cases, the vocal command is used to retrieve multiple videos that relate to the vocal command. In some cases, the single video or the multiple videos are already from a first-person perspective of a user who is to perform the physical task. In some embodiments, the single video or the multiple videos are from a third-person perspective of a user who is to perform the physical task.

Extended reality (XR) may refer to a number of related technologies. XR is an emerging umbrella term for immersive technologies that place a user directly into a computer-generated environment. For example, XR includes augmented reality (AR), virtual reality (VR), and mixed reality (MR) plus those that are still to be created. All of these immersive technologies extend the reality individuals experience by either blending the virtual and real worlds or by creating a fully immersive experience.

In augmented reality (AR), virtual information and objects are overlaid on the real world. This experience enhances the real world with digital details such as images, text, and animation. Augmented reality is accessed through AR glasses or via displays such as screens, tablets, and smartphones. In AR, the glasses displays overlaid digital elements while also showing the real environment. This means users are still able to interact with their environment. Examples of AR are games that overlay digital creatures onto the real world.

In a virtual reality (VR) experience, users are fully immersed in a simulated digital environment. Users wear a VR headset or head-mounted display to get a fully immersive view of an artificial world that fools their brain into believing they are interacting directly with whatever new world the VR developers created. VR may be a valuable technology in that users can experience and interact with a simulated environment which would be difficult to create in the real world.

In mixed reality (MR), also referred to as hybrid reality, digital and real-world objects co-exist and can interact with one another in real-time. Mixed reality requires an MR headset and more processing power than VR or AR. MR allows a user to place digital objects into the room the user is standing in and gives the user the ability to spin it around or interact with the digital object in any way possible. By permitting greater interaction, MR may have greater value in various scenarios, such as where manipulating generated objects is useful.

As depicted in FIG. 1, an XR headset 170 allows a user 110 to view a displayed image or a see-through view of the scene in front of the user 110. For example, user 110 may have the role of a user 110 who is to perform a physical task. In the examples, the physical task is illustrated as being changing a filter in an HVAC unit. While FIG. 1 presents an XR headset 170 as comprising a VR headset 170, other embodiments may include an AR headset, an MR headset, or another wearable computing device such as a pair of smart glasses, a smart helmet, a smart visor, a smart face-shield, smart contact lenses, or another head-mounted display device in lieu of VR headset 170.

In some cases, there is an XR headset 170. The XR headset 170 system may be configured to present a combined image that includes both a displayed (virtual) image and a see-through view of the physical environment or real-world scene in front of the user 110, where the displayed image is overlaid on the see-through view. If the XR headset 170 is a VR headset 170, there may be a pass-through mechanism in which a camera is integrated into the VR headset 170 so that when rendering the virtual reality scene the user is able to view the user's hand positions as well as a rendering of the relevant structures involved in the physical task.

In different operational modes, an XR headset 170 may present the displayed image so that the area of the displayed image is transparent, semitransparent or opaque. In other words, when operating in a transparent mode, the see-through view of the real-world scene is unblocked. An overlaid displayed image may be provided with low contrast. Similarly, when operating in the semitransparent mode, the see-through view of the real-world scene is partially blocked. An overlaid displayed image can be provided with higher contrast. Finally, when operating in the opaque mode, the see-through view of the real-world scene is fully blocked. An overlaid displayed image can be provided with high contrast.

As will be discussed further below, in different embodiments, some XR headsets 170 can also provide a see-through display for an augmented reality (AR) view. In such a display configuration, real-world scenes are visible to the user 110. However, additional image information is overlaid on the real-world scenes. In one embodiment, there may be more than one area in which the display of images over the real-world view occurs. Thus, a displayed image may be viewed by the user 110 at the same time that a view of the scene from the surrounding environment may be viewed. The displayed image (virtual projection) and the real-world view may be viewed as a combined image where the displayed virtual image is overlaid on the see-through view.

In most cases, the XR headset 170 system includes a wearable frame with lenses that have display areas and clear areas. The XR headset 170 system may also have image sources and associated optics to present image light from the image source to the display areas. When worn, the frame is supported on the user's head with frame arms ("arms"). In some embodiments, the arms may contain electronics such as a processor to drive the displays and peripheral electronics such as batteries and wireless connection(s) to other information sources (for example, through Wi-Fi, Bluetooth, cellular or other wireless technologies). One or more cameras may be included to capture images of the surrounding environment.

The locations of the various components in the XR headset 170 system may vary in different embodiments. The lens may also include controllable darkening layers in the display areas configured to change the opacity behind the respective portions of the display area, thereby enabling changes in operating mode between transparent, semi-transparent and opaque in the areas where images are displayed. An XR headset 170 may provide image information to one eye of the user 110 or both eyes of the user 110. If image information is provided to both eyes of the user 110, the image information may be adapted to each eye to provide stereoscopic three-dimensional (3D) effects.

A wide variety of XR headset 170 systems and image sources to provide images for display are known in the art including organic light-emitting diode (OLED) displays, quantum dot based light emitting diodes (QLED) displays, liquid crystal displays (LCDs), or liquid crystal on silicon (LCOS) displays, among others. In addition, the image sources may be microprojectors or microdisplays with associated optics to present the image light to the display areas for viewing by human eyes. In different embodiments, the optics associated with the image sources relay the image light from the image sources to the display areas, and can include refractive lenses, reflective lenses, mirrors, diffractive lenses, and/or holographic lenses or waveguides.

As noted above, in some embodiments, the XR headset 170 may be semitransparent, thereby enabling the user to view the real-world scene beyond the display, with projected images appearing superimposed or overlaid upon the background scene. Thus, the user 110 may view a scene through a partially transparent XR headset 170 where real world objects, like a desk, a table and walls, are partially visible through the XR headset 170 which also places virtual objects within the visible scene. The virtual object(s) may be anchored to the touchscreen surface. This approach provides the user 110 with an augmented reality experience in which the user 110 can see the "real world" through the display while simultaneously viewing virtual objects that appear to be fixed in real locations or on real surfaces.

Figure 3:
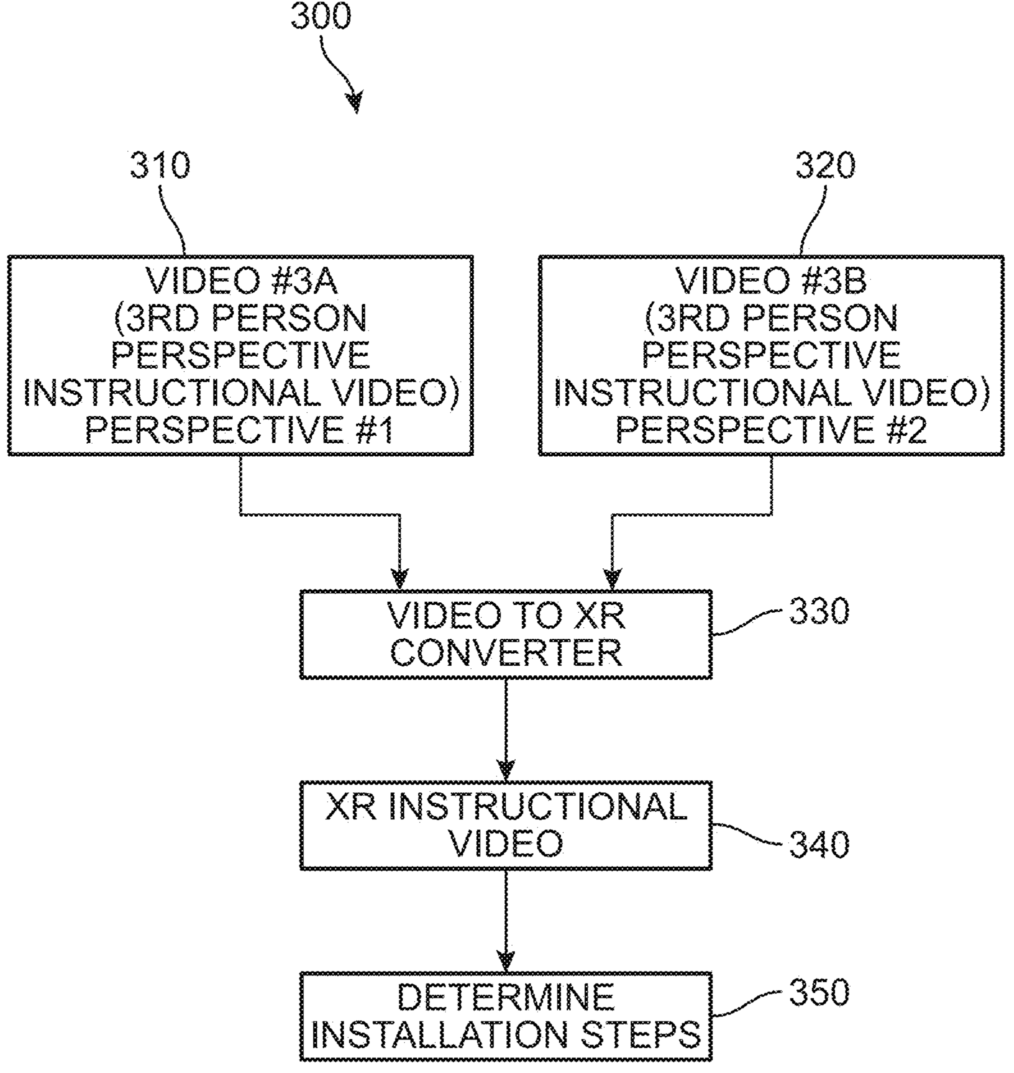
FIG. 3 is a schematic view of a computing system for transforming videos to produce an extended reality (XR) instructional video, according to an embodiment.

FIG. 3 is a schematic view 300 of a computing system for transforming videos to produce an extended reality (XR) instructional video, according to an embodiment. In FIG. 3, the user 110 may have selected one or more videos to generate an extended reality (XR) video that shows a user 110 how to perform the physical task from the user's perspective. For example, FIG. 3 shows that there may be a Video #3A 310 that is a third-person perspective instructional video and a Video #3B 320 that is another third-person perspective instructional video of the physical process.

The Video #3A 310 and the Video #3B 320 are provided as inputs to a video to XR converter 330. The video to XR converter 330 analyzes the videos that are provided to it as inputs and transforms the videos so that the contents of the videos are provided as an extended reality (XR) instructional video 340. Such a transformation may involve using graphical and geometric techniques to transform the input videos so that the resultant transformed video shows how to perform the physical task, but from a first-person perspective that is suitable for display using an XR headset, such as XR headset 170.

As described below, such an XR instructional video 340 can then be analyzed to determine installation steps 350. For example, a model may analyze the XR instructional video 340 by breaking the XR instructional video 340 into parts and characterizing each part as a separate step. Examples of such decomposition into steps are provided, below.

Some embodiments may include provisions for identifying a video showing how to accomplish a given physical task. In some embodiments, the video is based on one or more videos retrieved from a video repository. In some cases, the video is an extended reality (XR) video produced based on such one or more videos. In some embodiments, the XR video is an augmented reality (AR) instructional video. In some cases, the XR video may be supplemented with phantoms showing the user how to guide the user's hands. In some cases, the XR video can be supplemented with phantoms showing the user the correct position and placement of an object that is being manipulated during a task. In some embodiments, the XR video includes graphics that indicate how to perform the physical task. Such graphics may include arrows or other indicators that help communicate how the user is to move the user's hands or an item held in the hands to accomplish the physical task.

In some cases, the XR video may provide instructions as to how to accomplish the task. In some case, the instructions are provided one at a time as the user completes tasks. In some embodiments, the instructions are provided all at once to help the user understand the overall process. However, providing the instructions all at once may be followed by providing them one at a time.

In some cases, the instructions are provided using animations. The animations may show correct motions of user's hands and/or the motions of an item held in the user's hands. Such animations may allow the user to follow along while accomplishing the task. The animations may be especially helpful because certain aspects of a physical task may require certain speeds and the animations can indicate which steps need to be performed quickly and which more slowly.

The animations can also illustrate if it is necessary to change the orientation of the user's hands, such as if twisting the user's hands is necessary. In some embodiments, elements of the real-world are integrated into the XR video. In some cases, the video shows the user's hands. In some embodiments, the video shows the user's hand positions as they evolve through the task.

Figure 4:
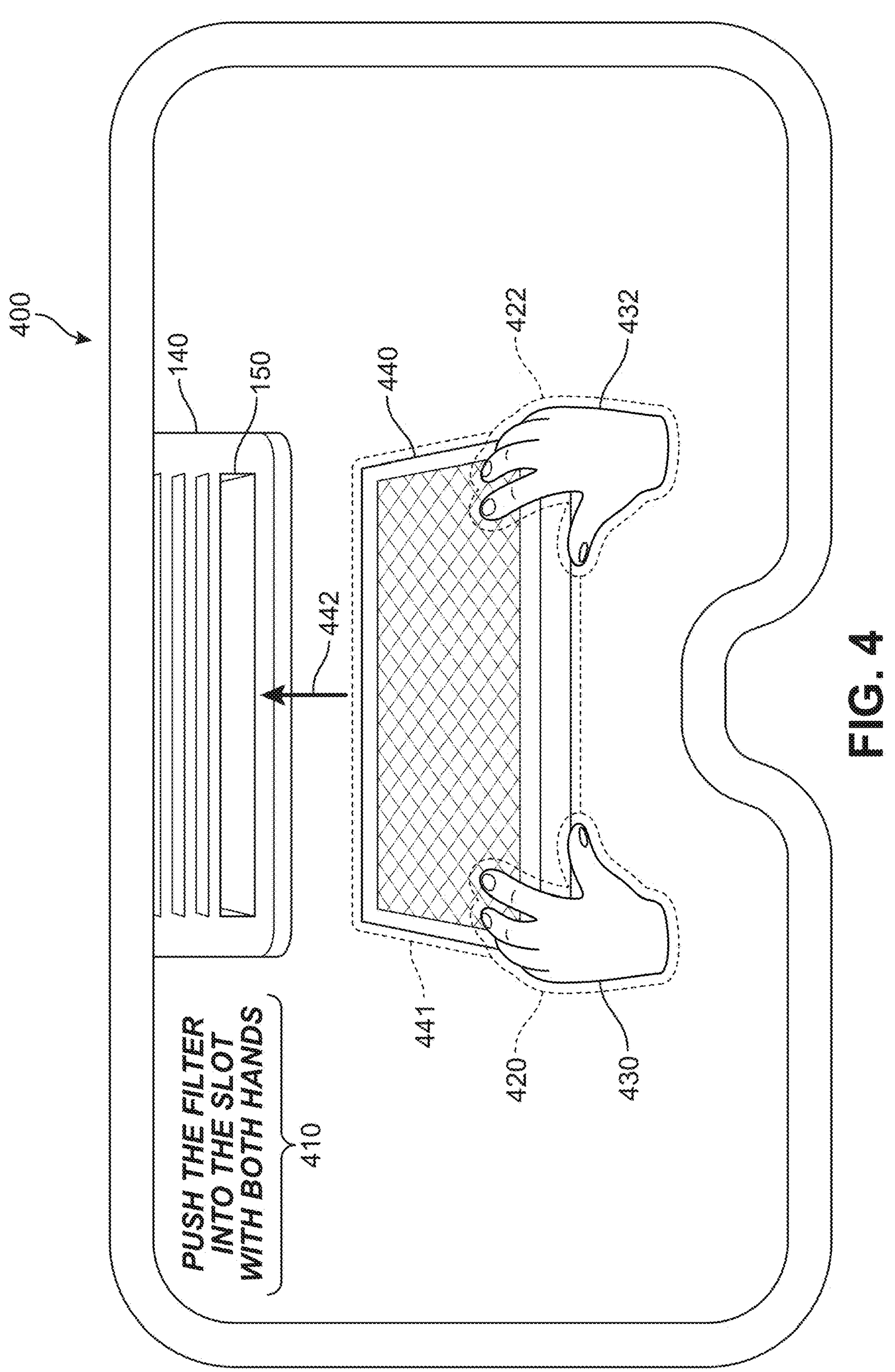
FIG. 4 is a schematic view from a perspective of a user using an extended reality (XR) headset, according to an embodiment.

FIG. 4 is a schematic view 400 from a perspective of a user using an extended reality (XR) headset, according to an embodiment. FIG. 4 shows aspects of how a user is instructed to install a filter 440 into a filter slot 150 of an HVAC unit 140. For example, the user 110 may receive a prompt 410. FIG. 4 shows that the prompt 410 may be "Push the Filter Into the Slot with Both Hands." The prompt 410 may be provided in a variety of ways. For example, the prompt 410 could be provided visually. In one case, the prompt 410 could be displayed as text on the XR headset. FIG. 4 illustrates how the prompt 410 may be displayed to the user as text in a corner of the XR headset.

However, this is only an example of displaying the prompt 410, and the prompt 410 may be provided in a different portion of the display. While illustrated as text in FIG. 4, prompt 410 may be provided as an audible prompt in addition to or instead of a visual prompt. For example, the phrase "Push the Filter Into the Slot with Both Hands" may be recited using a text-to-speech engine, such as by a speaker, headphones, or another audio production apparatus (which may be integrated into the XR headset). FIG. 4 also shows an XR illustration of a process of inserting a new HVAC filter 440 into an HVAC unit 140. The goal of the information presented FIG. 4 is to show the user how to insert the HVAC filter 440 into a filter slot 150 of the HVAC unit 140 by illustrating the process involved in the installation.

For example, the XR headset shows a view in which the new HVAC filter 440 is being held by the user. In FIG. 4, the new HVAC filter 440 is being held by a user's left hand 430 and right hand 432. However, as another form of instructive feedback, the XR headset shows an arrow 442. Arrow 442 points from the current position of HVAC filter 440 to a goal position in which the HVAC filter 440 is inserted in the filter slot 150. While not specifically illustrated in FIG. 4, it may also be necessary to extract a dirty pre-existing HVAC filter. The HVAC unit 140 may also have a filter lock 160, and the user may need to lock and unlock the filter lock 160 when removing a dirty HVAC filter or adding a new HVAC filter 440. For example, the directions to remove/install a HVAC filter may be accompanied by directions to twist the filter lock 160 to lock and unlock the filter lock 160.

In addition to showing an arrow 442 to illustrate how the user is to install the HVAC filter 440, embodiments contemplate additional means of showing the user how to install the HVAC filter 440. For example, there may be an animation showing various stages of installing the HVAC filter 440. As discussed above, step 350 may include determining installation steps. These steps may be provided to the user one at a time as they are performed. However, the installation steps may be provided in groups or as a whole.

In addition to the actual hands left hand 430 and right hand 432 of the user, FIG. 4 shows the use of phantoms, specifically left phantom 420 and right phantom 422. Such phantoms may be outlines or other representations of areas in which the user is to position actual hands left hand 430 and right hand 432. Thus, the phantoms provide a way to show the user where to position the user's hands. Moreover, the phantoms may be animated in a way that by following the phantoms, the user may move the user's hands in a correct manner. Hence, such phantoms provide an effective method of instruction and feedback when a user is performing a physical task.

As seen in FIG. 4, a filter phantom 441 may also be indicated. Filter phantom 441 may show the proper placement and orientation of HVAC filter 440 at different steps in the process.

Figure 5:
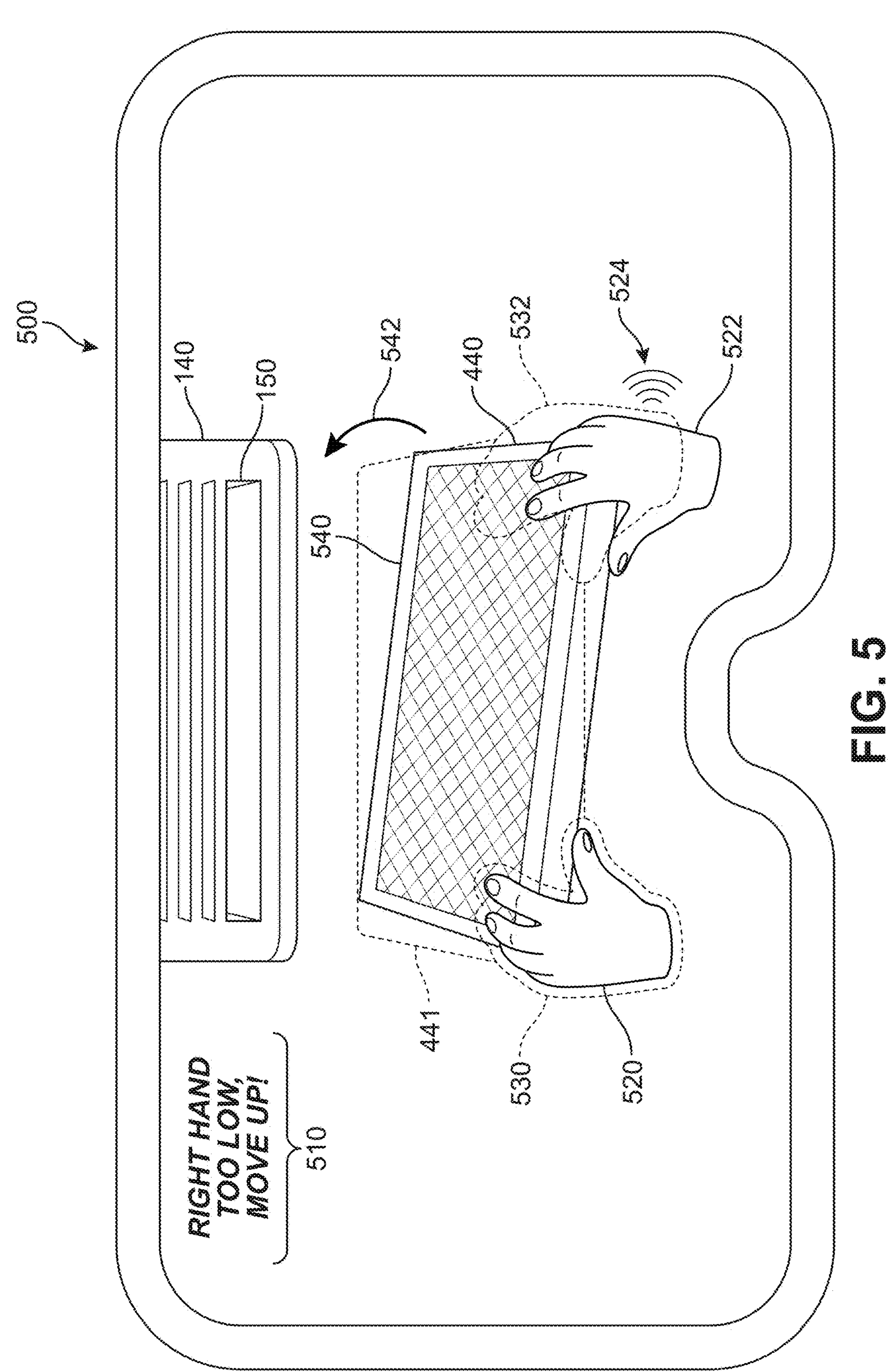
FIG. 5 is another schematic view from a perspective of a user using an extended reality (XR) headset, according to an embodiment.

FIG. 5 is another schematic view 500 from a perspective of a user using an extended reality (XR) headset, according to an embodiment. For example, in FIG. 5, the user is attempting to install an HVAC filter 540 into filter slot 150 of HVAC unit 140. Again, there may be a filter lock 160 that is not explicitly shown in FIG. 5.

In FIG. 5, HVAC filter 540 is not aligned properly with filter slot 150. Specifically, HVAC filter 540 is oriented improperly, such that HVAC filter 540 is too low on the right side. As shown in FIG. 5, the correct placement for an HVAC filter at this point is indicated by filter phantom 441, which remains aligned with filter slot 150. By contrast, the actual position of HVAC filter 440 is tilted down and out of alignment with filter slot 150.

The exemplary system includes provisions to indicate that the HVAC filter 540 needs to be repositioned. Accordingly, the system provides the user with a prompt 510. Such a prompt 510 may be "Right Hand Too Low, Move Up!". As discussed above, such a prompt 510 may be provided as visible text or as speech, or using both of these communication approaches. Additionally, a suitable icon, such as placement arrow 542, may be displayed.

For example, FIG. 5 shows a left hand 520 and a right hand 522 holding the HVAC filter 540. In FIG. 5, the right hand 522 is holding the HVAC filter 540 at a position that is too low. Left phantom 530 shows that the left hand 520 of the user is in a correct position. However, right phantom 532 shows that the right hand 522 of the user is not in a correct position. Furthermore, filter phantom 441 provides an additional visual indication that HVAC filter 440 is not properly oriented, since HVAC filter 440 does not align completely with filter phantom 441 in the user's visual field.

Beyond visual indicators, the left hand 520 and the right hand 522 may be affected by a device that provides haptic feedback. For example, the left hand 520 and the right hand 522 may be covered by haptic gloves that provide haptic feedback when one or both hands need to be repositioned.

Alternatively, the left hand 520 and the right hand 522 may wear a wearable such as a smart watch, a fitness tracker, a smart bracelet, or a smart ring. Such a wearable may provide haptic feedback that indicates to a user whether an adjustment is necessary for the physical process. FIG. 5 illustrates an example of such haptic feedback.

In FIG. 5, user left hand 520 does not receive any haptic feedback. Because there is no haptic feedback, a user may understand that the movements of the left hand 520 are correct and may continue in the current manner. By contrast, right hand 522 receives haptic feedback 524. For example, haptic feedback 524 may be a vibration. Such a vibration may occur in various ways to reinforce the performance of the physical task, as discussed further, below.

Some embodiments may include provisions for allowing a user to perform a physical task. In some embodiments, the system provides XR video that convey how the user is to perform the task. In some cases, the XR video is accompanied by instructions. In some embodiments, the instructions are automatically produced by analyzing the video with machine vision.

In some cases, the user is provided with the instructions. In some embodiments, the system may use motion sensors and machine vision to track the user's actions. In some cases, the system may use the user's tracked actions to establish how to provide instructions. In some cases, the instructions may be provided as visible text. In some cases, the instructions may be provided as produced speech.

In some cases, the user's actions are tracked based on tracking the motions of the user's hands. In some embodiments, the hand motions are tracked using machine vision. In some cases, the hand motions are tracked using at least one smart ring on at least one user finger. In some embodiments, the hand motions are tracked using a smart watch, fitness tracker, or smart bracelet. In some cases, the hand motions are tracked using smart gloves.

Figure 6:
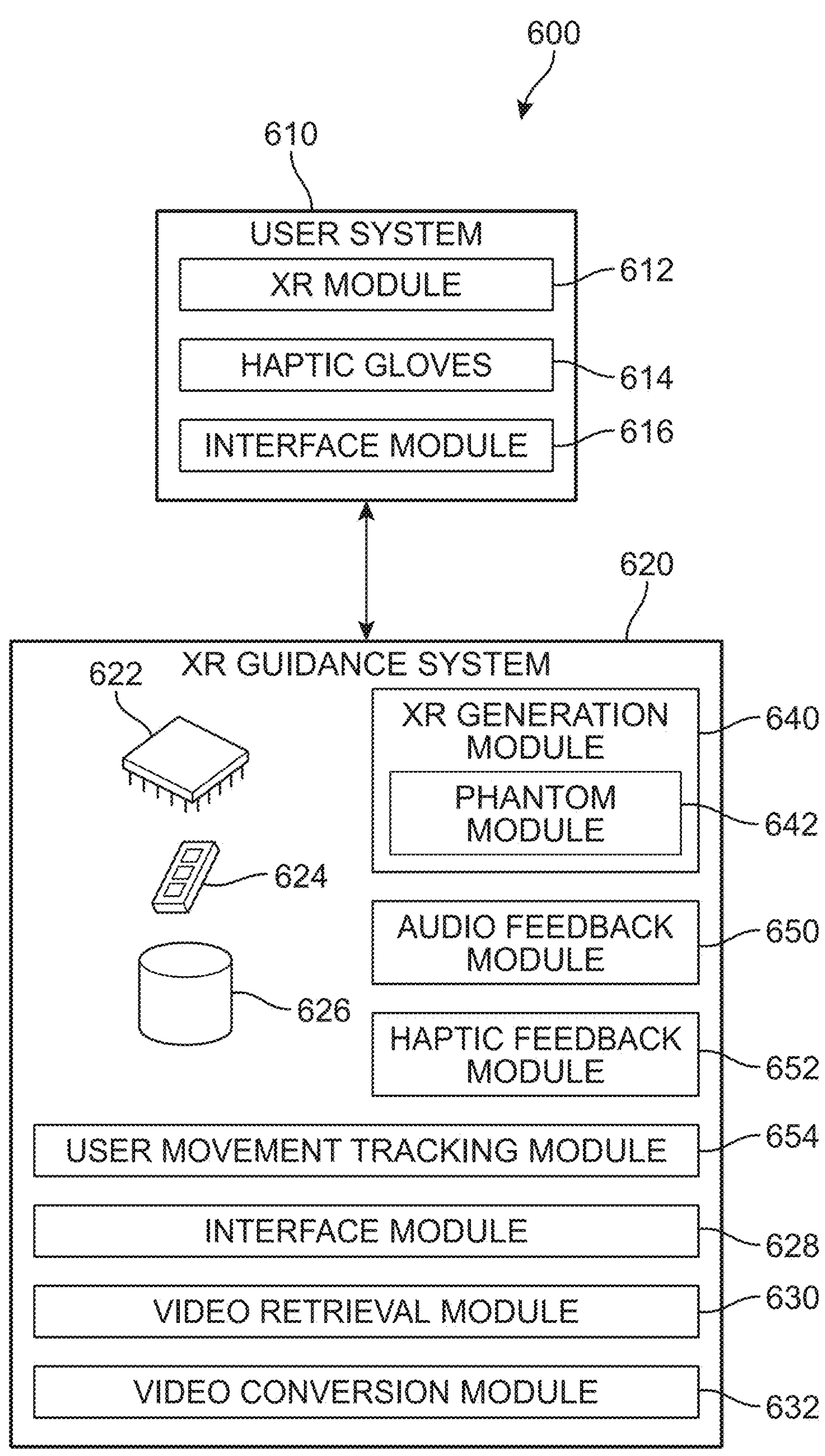
FIG. 6 is a schematic view of a user system that interacts with an extended reality (XR) guidance system, according to an embodiment.

FIG. 6 is a schematic view 600 of a user system that interacts with an extended reality (XR) guidance system, according to an embodiment. The user system 610 interacts with an XR guidance system 620 to facilitate providing instructions to a user of the system. In particular, user system 610 may include an XR module 612, haptic gloves 614, and an interface module 616. For example, XR module 612 may generate and present XR content to a user 110 using an XR headset 170. Such XR content may be based on information received from XR guidance system 620.

Haptic gloves 614 may help track a user's hand movements and provide haptic feedback to help the user perform the hand movements correctly. However, as noted above the haptic gloves 614 are only an example, and alternative elements such as a smart watch, fitness tracker, smart bracelet, or smart ring may serve to help track the user's hands and provide haptic feedback.

The interface module 616 facilitates communication between user system 610 and XR guidance system 620. For example, interface module 616 may receive content for display using XR module 612 and may also receive feedback to be provided using XR module 612. The interface module 616 may also manage interactions between haptic gloves 614 and XR guidance system 620.

XR guidance system 620 may include a variety of elements that manage providing guidance to the user system. These elements include at least one processor 622, at least one memory 624, and at least one storage 626. The at least one processor 622, at least one memory 624, and at least one storage 626 implement a guidance process, as discussed above. For example, these elements host and implement the various modules of the XR guidance system 620 and allow the modules to provide their respective functions.

The XR guidance system 620 also includes an XR generation module 640. The XR generation module 640 includes as a constituent part phantom module 642. The XR generation module 640 generates XR content to provide to user system 610 that illustrates how to perform the physical task. The phantom module 642 generates, in particular, graphics of the phantoms that help illustrate to the user how to position and move the user's hands.

The XR guidance system 620 also includes audio feedback module 650. Such an audio feedback module 650 may generate audio instructing the user how to perform the physical task. The audio may be an instruction that is part of the overall physical task. The audio may also be an action the user can take to resolve a problem with the user's hand motions.

The XR guidance system 620 also includes a haptic feedback module 652. Further, the XR guidance system 620 includes certain other modules that allow it to provide XR guidance for a user when performing a physical task. For example, the XR guidance system may include a user movement tracking module 654, an interface module 628, a video retrieval module 630, and a video conversion module 632. The user movement tracking module 654 can use various sources of information, such as locations sensors built into haptic gloves 614 or machine vision analyzing video footage of the user's hands to establish how the user is moving the user's hands.

The interface module 628 manages interactions between the XR guidance system 620 and the user system 610, from the perspective of the XR guidance system 620. The video retrieval module 630 receives a request pertaining to a desired physical task and retrieves relevant videos, as shown in FIGS. 1-2. For example, the video retrieval module 630 may perform a Web search of videos on the Internet, or may find relevant videos in a video repository. The video conversion module 632 may perform the conversion process shown in FIG. 3, by taking the retrieved videos and producing an XR video that can be provided to the user to show the user how to accomplish a given physical task.

Video conversion module 632 can comprise any suitable software for converting standard two dimensional videos into three-dimensional (3D) XR models that may be displayed for users in an XR environment. In some embodiments, video conversion model 632 could comprise separate submodules for converting standard videos into 3D object models and for incorporating 3D object models into an XR environment that is visible to a user. For example, the embodiments could make use of any of the systems and methods for converting 2D video to 3D object models as disclosed in Niebla et al., U.S. Pat. No. 9,438,878, titled "Method of converting 2d video to 3d video using 3d object models," which is herein incorporated by reference. The resulting 3D objects, for example representing objects to be manipulated by a user in completing tasks, could be embedded into an XR environment using any suitable XR software platform.

Some embodiments include provisions for tracking user motions as the user is provided with the XR video. In some embodiments, the user tracks user hand motions. In some embodiments, the user hand motions are compared to the correct motions. In some cases, such comparison is based on determining how the motions of the actual hands compare to motions of phantoms.

In some embodiments, the comparison confirms that the motions are correct motions. In some cases, if the motions are confirmed correct, no feedback occurs. In some embodiments, if the comparison confirms that the motion is correct, feedback indicates as much. In some cases, the comparison confirms that the motions are incorrect motions. In some embodiments, if the comparison indicates that the motions are incorrect, the embodiments determine a corrective action or establish how the motions deviate from the correct motion. In some cases, the feedback is auditory feedback. In some embodiments, the feedback is visual feedback.

In some cases, the feedback is haptic feedback. In some embodiments, the feedback merely indicates whether the user's motions are correct or incorrect. In some embodiments, the feedback provides further information that helps the user correct the incorrect motions. If the feedback is visual or audible, the feedback may include an instruction showing how to correct the user motion or explaining what the user is doing wrong.

If the feedback is haptic, the feedback may differ based on what it intends to communicate. For example, the feedback may be a haptic signal provided to a whole hand, a portion of a hand, or a specific finger depending on the intended feed. A right hand could vibrate while a left hand does not if the right hand is the hand that deviates from the proper position. An index finger could vibrate if the motions are correct while a middle finger could vibrate if the motions are incorrect, as an illustrative example.

Figure 7:
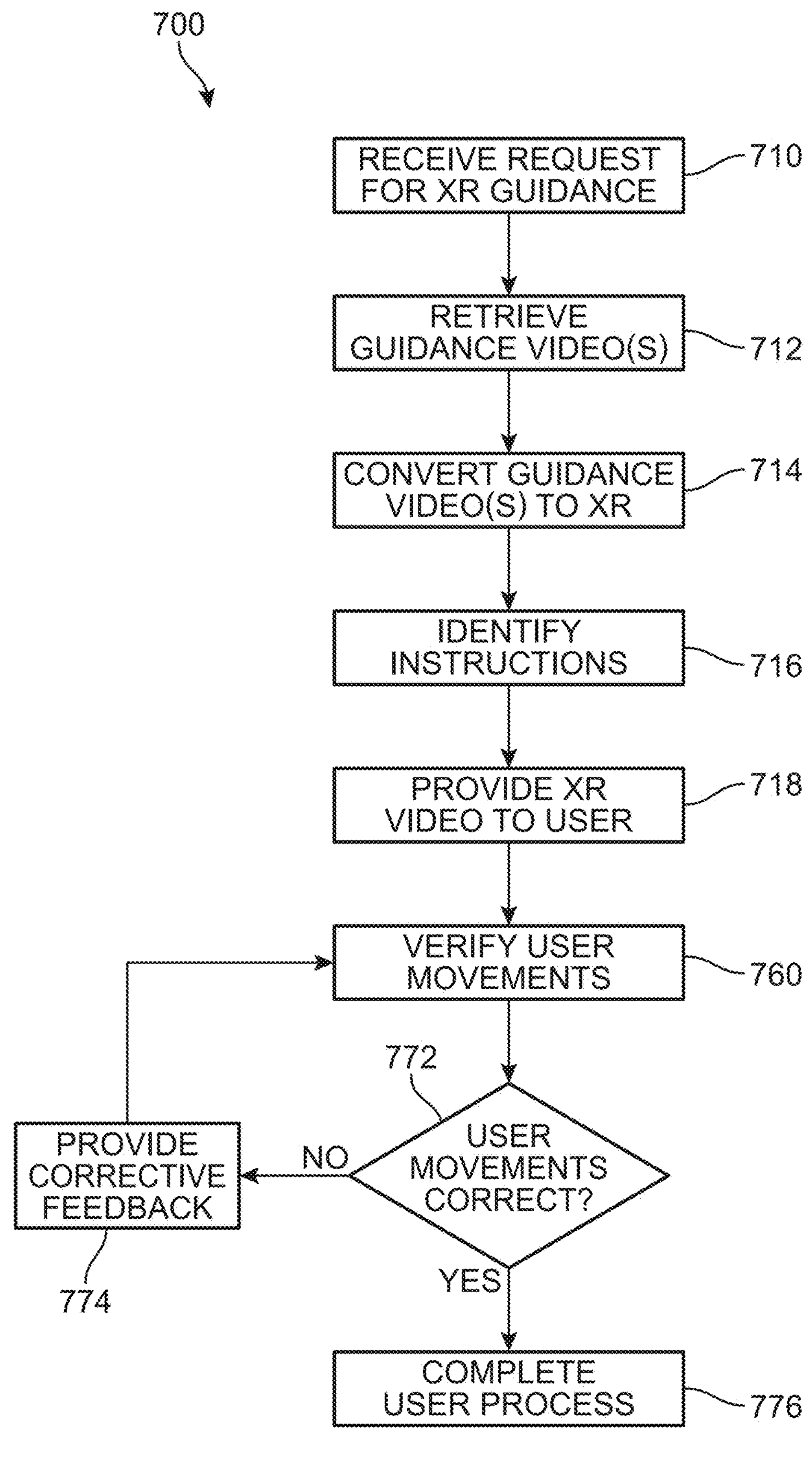
FIG. 7 is a flowchart of a process of using an extended reality (XR) guidance system showing a user how to perform a physical task, according to an embodiment.

FIG. 7 is a flowchart 700 of a process of using an extended reality (XR) guidance system showing a user how to perform a physical task, according to an embodiment. In step 710, the method receives a request for extended reality (XR) guidance. An example of such a request is presented in FIG. 1. Such a request may be a natural language request that acts as a search prompt.

For example, the user may ask how to perform a physical task (as a question) or state that they wish to perform a physical task (as a statement). In step 712, the method retrieves one or more guidance videos. The retrieving is based on the natural language request from step 710. The retrieving may use a search engine to query the Internet, or may search a video repository, as discussed above.

Then, in step 714, the method converts guidance videos to XR. For example, there may be at least one guidance video showing how to perform the given task. These guidance videos may need to be transformed from a third-person to a first-person perspective. It may also be necessary to adapt the guidance videos so that they are XR videos, suitable for display through an XR headset.

Once the guidance videos have been converted to XR, they may be processed to identify instructions for the user, as in step 716. For example, the identification of such instructions may involve using machine vision to appreciate the specific movements a user is to make when performing a specific physical task. As an alternative, an audio track may be processed to identify instructions. As another alternative, the physical task may be associated with a web page or another document defining steps involved in the physical task to be performed.

After the instructions are identified, the method provides the XR video to the user in step 718. For example, the method displays the XR video to the user such as through an XR headset 170. As the method provides the XR video to the user, it is assumed that the user will follow along with the XR video by moving each hand along with the XR video. Part of the providing of step 718 is the provision of the instructions to perform the various steps involved in the physical task to be accomplished. Step 718 may also include using phantoms to illustrate how to perform the physical task.

After step 718, the method performs step 760, in which the method verifies user movements. That is, the method confirms that the user is moving in a way that matches the correct movements to perform the physical task. For example, the method may compare the user's movements to the phantoms or otherwise compare the user's movements to correct hand movements required to perform the physical task. In step 772, the method proceeds based on whether the user movements are correct. If the movements are correct, the method continues to step 776 and the user completes the user process. However, if step 772 determines that the user's movements are not correct, the method proceeds to step 774. In step 774, the method provides corrective feedback. Thus, as step 760 verifies user movements, step 772 provides for a feedback loop where step 774 provides for corrective feedback until all of the user movements are performed correctly and the user process is completed at step 776.

The embodiments provide systems and methods for converting videos into extended reality videos. Specifically, the embodiments provide systems and methods that allow users to identify a physical task to accomplish. Embodiments retrieve one or more videos that show how to accomplish the given physical task. For example, the one or more videos may provide a third-person perspective of how to perform the physical task. A converter may transform these videos so that they are integrated into an extended reality (XR) video.

Such an XR video can be presented to a user. The XR video will be first-person and show content overlaid onto the user's environment when the user is performing the physical task. When producing the XR video, the XR video may be analyzed with machine vision or another source of information (such as an NLP analysis of an audio track or NLP analysis of a related webpage) to produce instructions. The XR video may be accompanied by visual, auditory, and haptic feedback. This feedback helps the user adjust the user's movements to perform the physical task properly. Hence, embodiments provide for a new way of using videos from a repository to help a user how to understand how to perform a physical task. Moreover, embodiments provide innovative ways of providing feedback through use of phantoms as visual feedback and use of haptic feedback to help the user adjust hand motions.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of generating extended reality videos and using the extended reality videos to provide instructions for physical tasks, comprising:

receiving a request for extended reality guidance for a given physical task;

retrieving guidance videos showing how to perform the given physical task;

converting the guidance videos to an extended reality video;

processing the extended reality video to determine a set of instructions for performing the given physical task;

providing the extended reality video to a user;

tracking user movements while the user performs the given physical task;

confirming correctness of the user movements; and providing feedback to the user based on the correctness of the user movements.

2. The method of claim 1, further comprising providing a visual indicator showing the user how to correct the user movement.

3. The method of claim 1, further comprising providing the determined set of instructions to the user while providing the extended reality video to the user.

4. The method of claim 1, wherein the set of instructions is determined based on analyzing an audio track corresponding to the extended reality video.

5. The method of claim 1, wherein the guidance videos are originally from a third-person perspective and are converted to a first-person perspective.

6. The method of claim 1, wherein the providing the extended reality video comprises displaying phantoms showing the user how to position the hands of the user.

7. The method of claim 1, wherein the providing feedback comprises at least one of providing visual feedback, auditory feedback, and haptic feedback.

8. A system for generating extended reality videos and using the extended reality videos to provide instructions for physical tasks, comprising:

at least one processor, configured to:

receive a request for extended reality guidance for a given physical task;

retrieve guidance videos showing how to perform the given physical task;

convert the guidance videos to an extended reality video;

processing the extended reality video to determine a set of instructions for performing the given physical task;

provide the extended reality video to a user;

track user movements while the user performs the given physical task;

confirm that the user movements are incorrect; and provide feedback to the user to help the user correct the user movements.

9. The system of claim 8, wherein the feedback is visual feedback including a visual indicator showing the user how to correct the user movement.

10. The system of claim 9, wherein the feedback is visual feedback including a movement of a phantom showing the user how to correct the user movement.

11. The system of claim 8, wherein the feedback is auditory feedback instructing the user how to correct the user movement.

12. The system of claim 8, wherein the feedback is haptic feedback instructing the user how to correct the user movement by providing a haptic reinforcer when the user movement is correct.

13. The system of claim 8, wherein the feedback is haptic feedback instructing the user how to correct the user movement by providing a haptic reinforcer when the user movement is incorrect.

* * * * *